(12) United States Patent    (10) Patent No.: US 8,364,725 B2
Bhola et al.    (45) Date of Patent: Jan. 29, 2013

(54) BIDIRECTIONAL NAVIGATION BETWEEN MAPPED MODEL OBJECTS

(75) Inventors: Saurabh Bhola, Drogheda (IE); Gary Denner, Longwood (IE)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 13/071,371

(22) Filed: Mar. 24, 2011

(65) Prior Publication Data

US 2012/0246199 A1    Sep. 27, 2012

(51) Int. Cl.
*G06F 17/30* (2006.01)
(52) U.S. Cl. ............... 707/805; 707/792; 707/798
(58) Field of Classification Search .............. None
See application file for complete search history.

(56) References Cited

U.S. PATENT DOCUMENTS

| | | | |
|---|---|---|---|
| 6,047,280 A | 4/2000 | Ashby et al. | |
| 6,609,132 B1 | 8/2003 | White et al. | |
| 7,546,226 B1 | 6/2009 | Yeh et al. | |
| 7,589,732 B2 | 9/2009 | Burtnyk et al. | |
| 7,613,917 B1 | 11/2009 | Chojnacki | |
| 7,743,041 B2 | 6/2010 | Shultz et al. | |
| 8,126,926 B2* | 2/2012 | Atre et al. | 707/798 |
| 2003/0046041 A1* | 3/2003 | Copel | 703/2 |
| 2003/0195725 A1* | 10/2003 | Hashash | 703/2 |
| 2004/0243461 A1 | 12/2004 | Riggle | |
| 2005/0033725 A1 | 2/2005 | Potter et al. | |
| 2005/0076311 A1* | 4/2005 | Kusterer et al. | 715/853 |
| 2007/0209031 A1* | 9/2007 | Ortal et al. | 717/104 |
| 2009/0164197 A1 | 6/2009 | Matthews et al. | |
| 2009/0201294 A1* | 8/2009 | Hayes | 345/440 |
| 2010/0138750 A1* | 6/2010 | Trinler | 715/736 |
| 2011/0246444 A1* | 10/2011 | Jenkins et al. | 707/711 |

* cited by examiner

*Primary Examiner* — Debbie Le
(74) *Attorney, Agent, or Firm* — Janaki K. Davda; Konrad, Raynes, Davda & Victor LLP

(57) ABSTRACT

Provided are techniques for displaying the model objects in models in a models stack. In response to a model object in a model of the models stack being selected as an initial context, one or more navigation paths associated with the selected model object are displayed, wherein each of the navigation paths has nodes represented as graphical components that are built in real time. In response to a user selecting a node in one of the one or more navigation paths, a new model object represented by the selected node in the models stack is navigated to in one of a forward direction and a backward direction to provide bidirectional navigation between the model objects in the models without loosing the initial context and one or more navigation paths associated with the new model object and at least one appended node that represents a previously traversed model object are displayed.

25 Claims, 15 Drawing Sheets

“BIDIRECTIONAL NAVIGATION BETWEEN MAPPED MODEL OBJECTS”

BACKGROUND

Embodiments of the invention relate to bidirectional navigation between mapped models.

Industry models are created by identifying, describing, and structuring the business functions, data, and processes typically found in large organizations (e.g., financial industry, tele-communications, insurance, healthcare, retail, etc) in such a way that it can be used to accelerate Information Technology (IT) projects. These industry models ensure that business requirements for major initiatives are captured and expressed in a manner that can be understood by the IT organization and are reflected in all levels of the subsequent application development process.

Different types of models (e.g., conceptual models, data warehouse models, process models, and service models) may be used. Conceptual models provide enterprise wide definitions of concepts and data. Data warehouse models assist with creating a consistent enterprise view of information. Process models assist with process simplification and business process re-engineering. Service models assist in the creation of a services oriented architecture environment.

Each model may have one or more model objects. Inter-model mappings may exist between model objects of different types of models in a models stack. For example, model objects of data warehouse models (logical data models) may be mapped to model objects of a conceptual model; model objects of a process model and a services model may be mapped to model objects of the conceptual model; etc. However, in conventional systems, there is no way to navigate between the mapped model objects in the models stack to give the users a view of how the models relate to each other.

SUMMARY

Provided are a method, computer program product, and system for displaying the model objects in models in a models stack. In response to a model object in a model of the models stack being selected as an initial context, one or more navigation paths associated with the selected model object are displayed, wherein each of the navigation paths has nodes represented as graphical components that are built in real time and that represent the selected model object and other model objects from the models in the models stack. In response to a user selecting a node in one of the one or more navigation paths, a new model object represented by the selected node in the models stack is navigated to in one of a forward direction and a backward direction to provide bidirectional navigation between the model objects in the models without loosing the initial context and one or more navigation paths associated with the new model object and at least one appended node that represents a previously traversed model object are displayed.

BRIEF DESCRIPTION OF THE SEVERAL VIEWS OF THE DRAWINGS

Referring now to the drawings in which like reference numbers represent corresponding parts throughout:

FIG. 13 is formed by FIGS. 13A and 13B.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments navigate in a forwards and backwards direction between mapped model objects in the same or different models, without loosing the context in which the user is navigating. Context refers to the model that the user is currently navigating through. In certain embodiments, an initial context (i.e., a starting context) may be set using pre-defined user preferences or using a short key on the user interface. That is, before starting navigation, the user may configure the initial context. In such embodiments, the initial context can be reset (e.g., via the user interface). Embodiments analyze the route that a user has taken to navigate through model objects in a models stack (i.e., a stack of models) and display the navigation path so that the user can navigate back through this same navigation path. Embodiments provide a navigation path to navigate between (forward & backwards) model objects in models for better model usability for a user (e.g., a data modeler).

Figure 1:
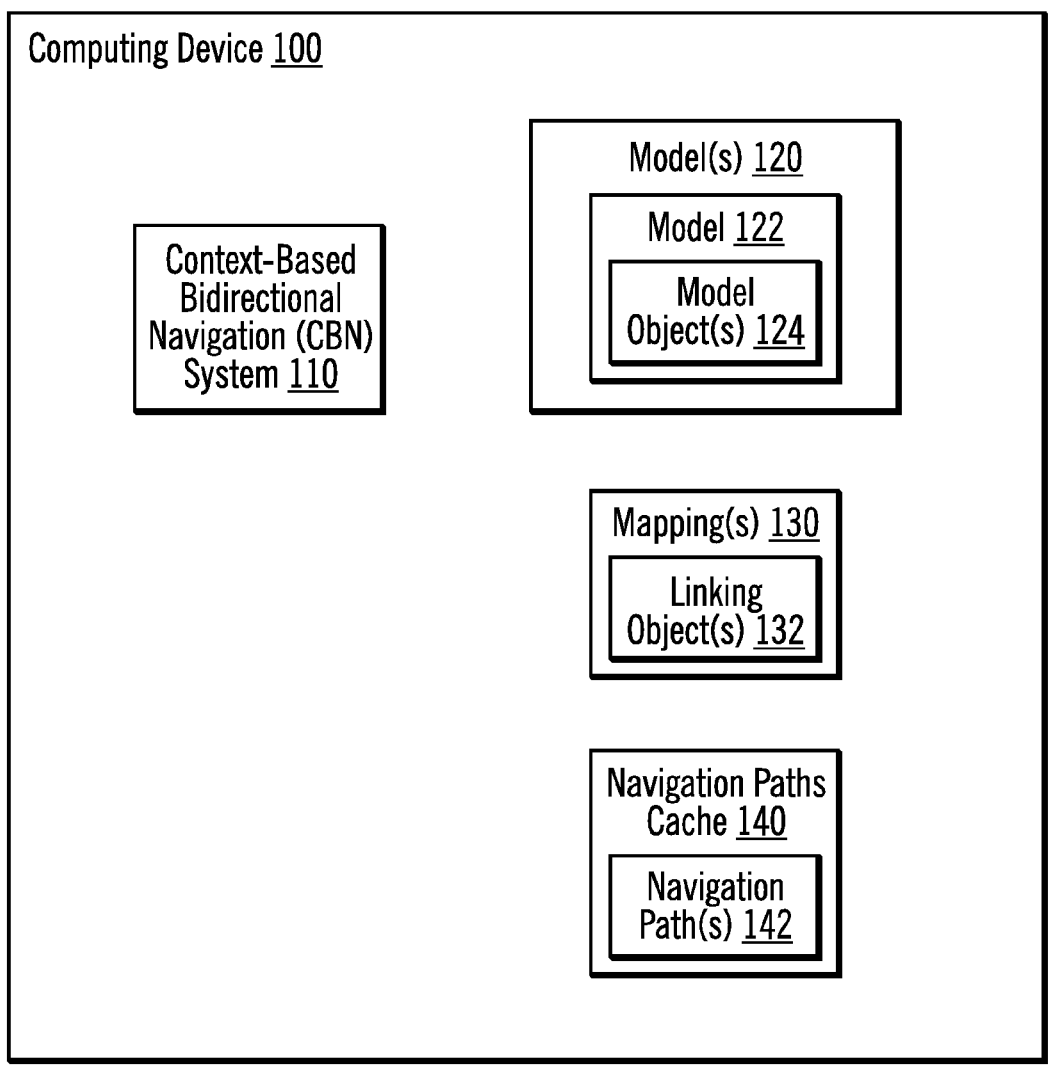
FIG. 1 illustrates, in a block diagram, a computer architecture in accordance with certain embodiments.

FIG. 1 illustrates, in a block diagram, a computer architecture in accordance with certain embodiments. A computing device 100 includes a Context-based Bidirectional Navigation (CBN) system 110, one or more models 120, one or more mappings 130 (or linkages), and a navigation paths cache 140. A set of models 120 may form a stack having layers (models stack layers). Each of the one or more models 120 includes one or more model objects. For example, model 122 includes one or more model objects 124. The one or more mappings 130 may be represented using one or more linking objects 132. The navigations path cache 140 stores one or more navigating paths 142. Each navigation path 142 is made up of one or more model objects mapped together. For example, a navigation path 142 from nodes A→B→C represents a model object A mapped to a model object B, which is mapped through to a model object C. In certain embodiments, the model objects in a navigation path 142 may be represented as Graphical User Interface (GUI) nodes to the user at runtime. That is, in certain embodiments, a navigation path 142 has nodes represented as graphical components, and the nodes are built in real time. Also, in certain embodiments, a navigation path 142 starts with a node representing a selected model object and ends with a different model object in the models stack (either in a same or different model 120).

Figure 2:
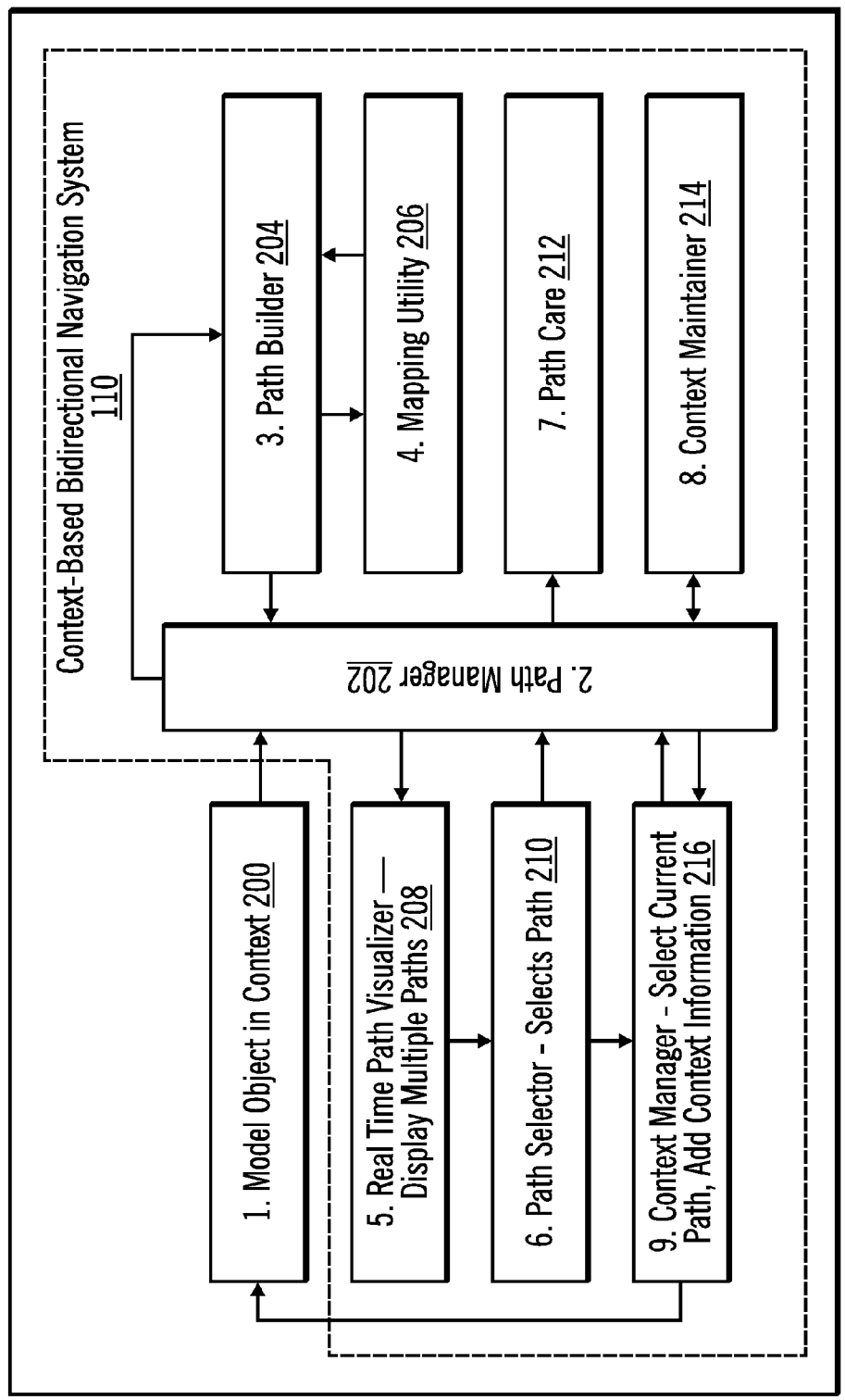
FIG. 2 illustrates, in a block diagram, further details of the Context-based Bidirectional Navigation (CBN) system 110 in accordance with certain embodiments.

FIG. 2 illustrates, in a block diagram, further details of the CBN system 110 in accordance with certain embodiments. In particular, blocks 202-216 are components of the CBN system 110 in accordance with certain embodiments. In block 200, a model object in context may be any model object from any model 120 specified in a models stack (e.g., a conceptual model, a data model, a process model, or a services model), with the model objects mapped to one or multiple model objects across the models stack layer.

In block 202, a navigation path manager manages building and processing of navigation paths 142 between different mapped model objects across models stack layers. In block 204, a navigation path builder builds one or more accessible navigation paths 142 from a selected model object in one models stack layer. The navigation path builder builds the one or more accessible navigation paths 142 in context intelligently by using knowledge embedded in the model object via mappings 130 in a recursive way till no more mappings 130 are found. The navigation path builder outputs one or more navigation paths 142.

In block 206, a mapping utility identifies the mappings 130 of the model object in context to other model objects across multiple models 120 in the models stack layers. Thus, the mapping utility assists the navigation path builder to use this information to build navigation paths 142 between model object in context to other model objects across multiple models 120 in the models stack layer.

In block 208, a real time navigation path visualizer visualizes the navigation paths 142 from the model object in context to other, multiple mapped model objects, and the navigation paths 142 are visualized with GUI nodes of model objects linked to each other.

In block 210, a navigation path selector allows a user to select one navigation path 142 from a list of navigation paths 142 that are available. For example, the user can click any node from the selected navigation path 142 to jump to a model object (i.e., any model object in the selected navigation path 152), which will then become the current context of the user.

In block 212, a navigation paths cache 140 is used to cache the navigation paths 142 for reuse. In certain embodiments, information and a current navigation path 142 are cached. The information may be a path object that stores a path. For example, Path1=A→B–C, and Path1 is a path object that is a container of Path1. The path navigations cache 140 can store multiple path objects, which can be referenced back from the navigation paths cache 140, instead of being built at runtime. Also, navigation paths 142 in the navigation paths cache 140 can be shared (e.g., on a social network in a shared model).

In block 214, a context maintainer intelligently builds the context information using the navigation paths cache 140 and current traversal node in the navigation path 142 the user has selected. The context maintainer also passes the context information (e.g., the initial context and the current context) so that nodes that represent previously traversed model objects may be appended to the traversal navigation path 142 in the user interface.

In block 216, a context manager selects the current navigation path 142 and adds the context information to the navigation path 142 so that the CBN system 110 knows where the user has come from.

A mapping 130 may be described as a link between two model objects. For example, a model object from a data model may be linked to a model object from a conceptual model (e.g., a business model). For example, a model object (e.g., an entity or attribute) of the data model is linked to a corresponding model object of the conceptual model. Two model objects being linked together indicates that there is information about the linked model objects stored in a linking object 132, and there is information to navigate to from one linked model object to the other the linked model object using the linking object 132. A model object may be linked to multiple model objects, and the linked model object stores the information to navigate to each of the multiple, linked model objects.

Figure 3:
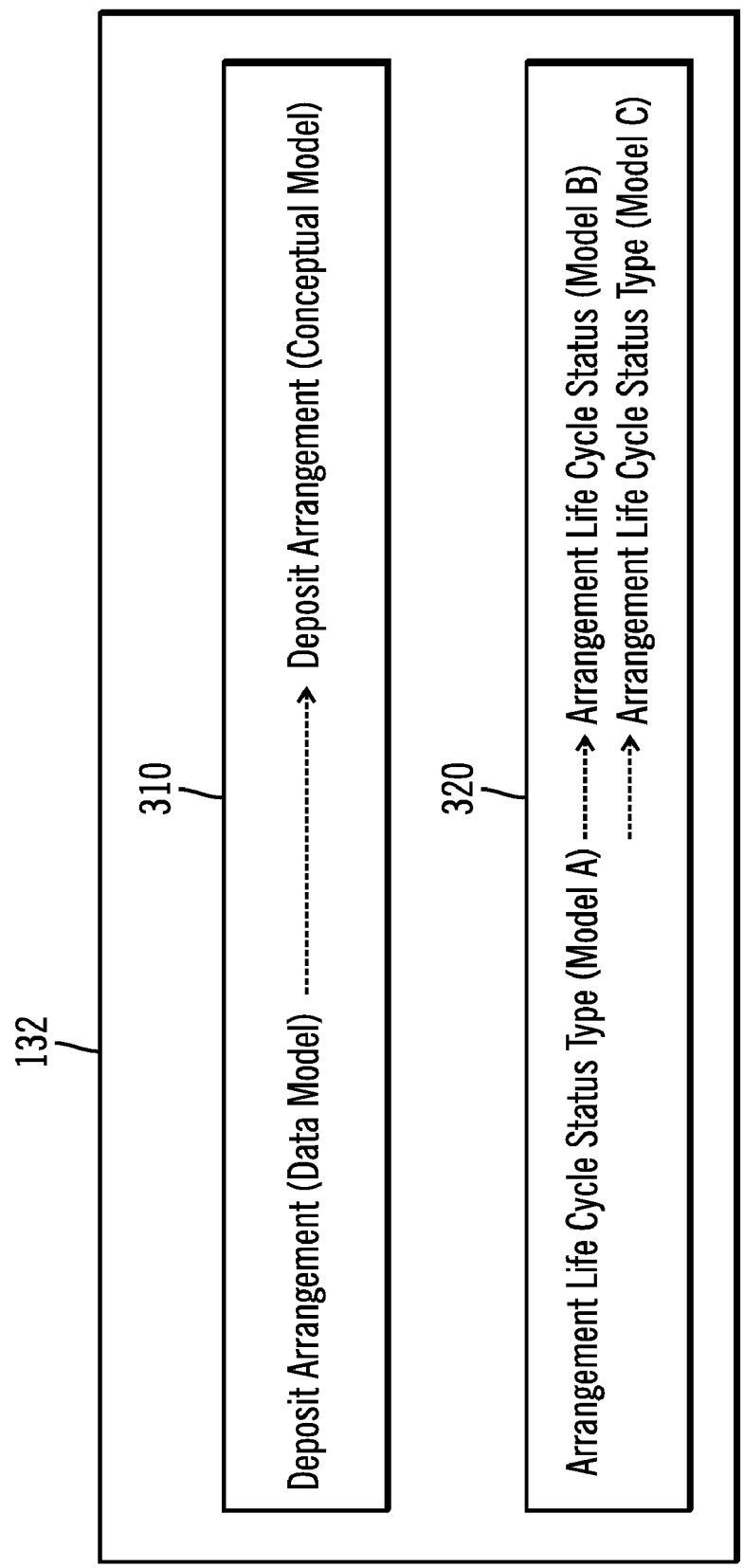
FIG. 3 illustrates example linking objects in accordance with certain embodiments.

FIG. 3 illustrates example linking objects 132 in accordance with certain embodiments. With linking object 310, the Deposit Arrangement model object from a data model is linked (i.e., mapped) to a Deposit Arrangement model object in a conceptual model. The linking object 310 includes information to enable the CBN system 110 to create a navigation path 142 between the two Deposit Arrangement model objects and to navigate between the two Deposit Arrangement model objects in the different models.

With linking object 320, an Arrangement Life Cycle Status Type model object from a model A is linked to an Arrangement Life Cycle Status model object in a model B and is linked to an Arrangement Life Cycle Status Type model object in a model C. The linking object 320 includes information to enable the CBN system 110 to create navigation paths 142 from the Arrangement Life Cycle Status Type model object from the model A to the Arrangement Life Cycle Status model object in the model B and to the Arrangement Life Cycle Status Type model object in the model C.

For the linking object 310, there is a navigation path 142 between the Deposit Arrangement model object from the data model to the Deposit Arrangement model object in a conceptual model.

For the linking object 320, there are two navigation paths 142. There is one navigation path 142 from the Arrangement Life Cycle Status Type model object from the model A to the Arrangement Life Cycle Status model object in the model B. There is a second navigation path 142 from the Arrangement Life Cycle Status Type model object from the model A to the Arrangement Life Cycle Status Type model object in the model C.

Figure 4:
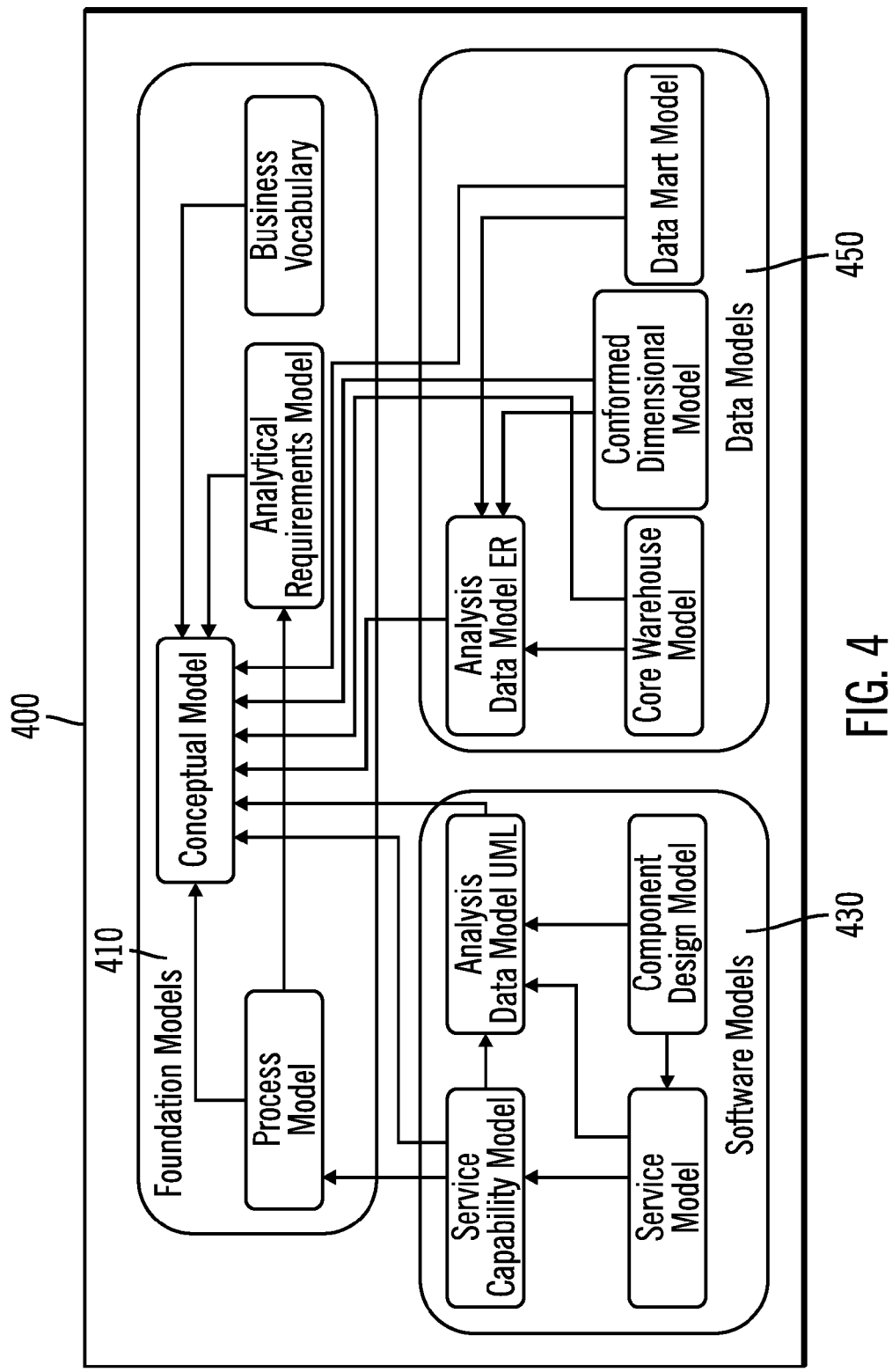
FIG. 4 illustrates a models stack and the relationships between models in accordance with certain embodiments.

FIG. 4 illustrates a models stack 400 and the relationships between models in accordance with certain embodiments. The models stack includes foundation models 410, software models 430, and data models 450. The black arrows represent inter-model mappings between different model objects.

Figure 5:
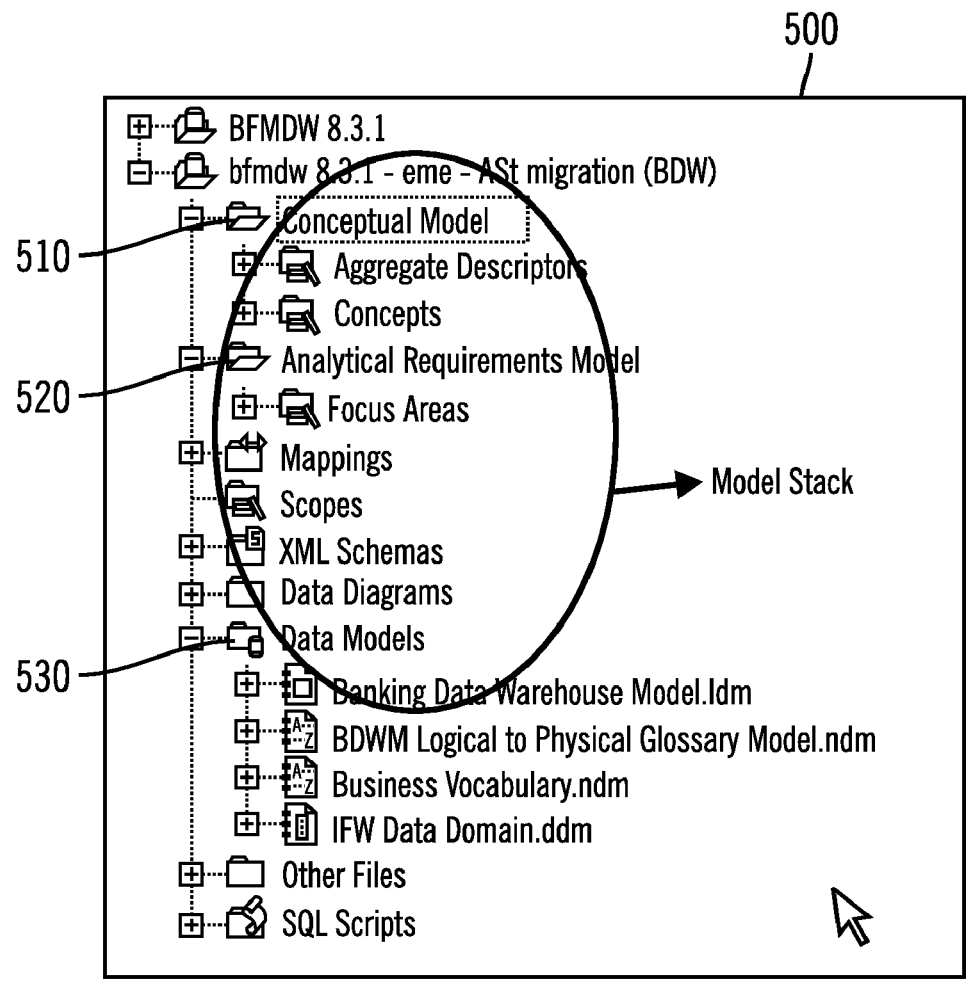
FIG. 5 illustrates a models stack represented in a tooling environment in accordance with certain embodiments.

FIG. 5 illustrates a model stack 500 represented in a tooling environment in accordance with certain embodiments. A portion of the models stack 400 of FIG. 4 is represented conceptually in the tooling environment of FIG. 5. The models stack 500 includes a conceptual model 510, which has been selected. In certain embodiments, the selection is indicated by the dotted box around conceptual model 510. The models stack 500 also includes an analytical requirements model 520 and data models 530.

Figure 6:
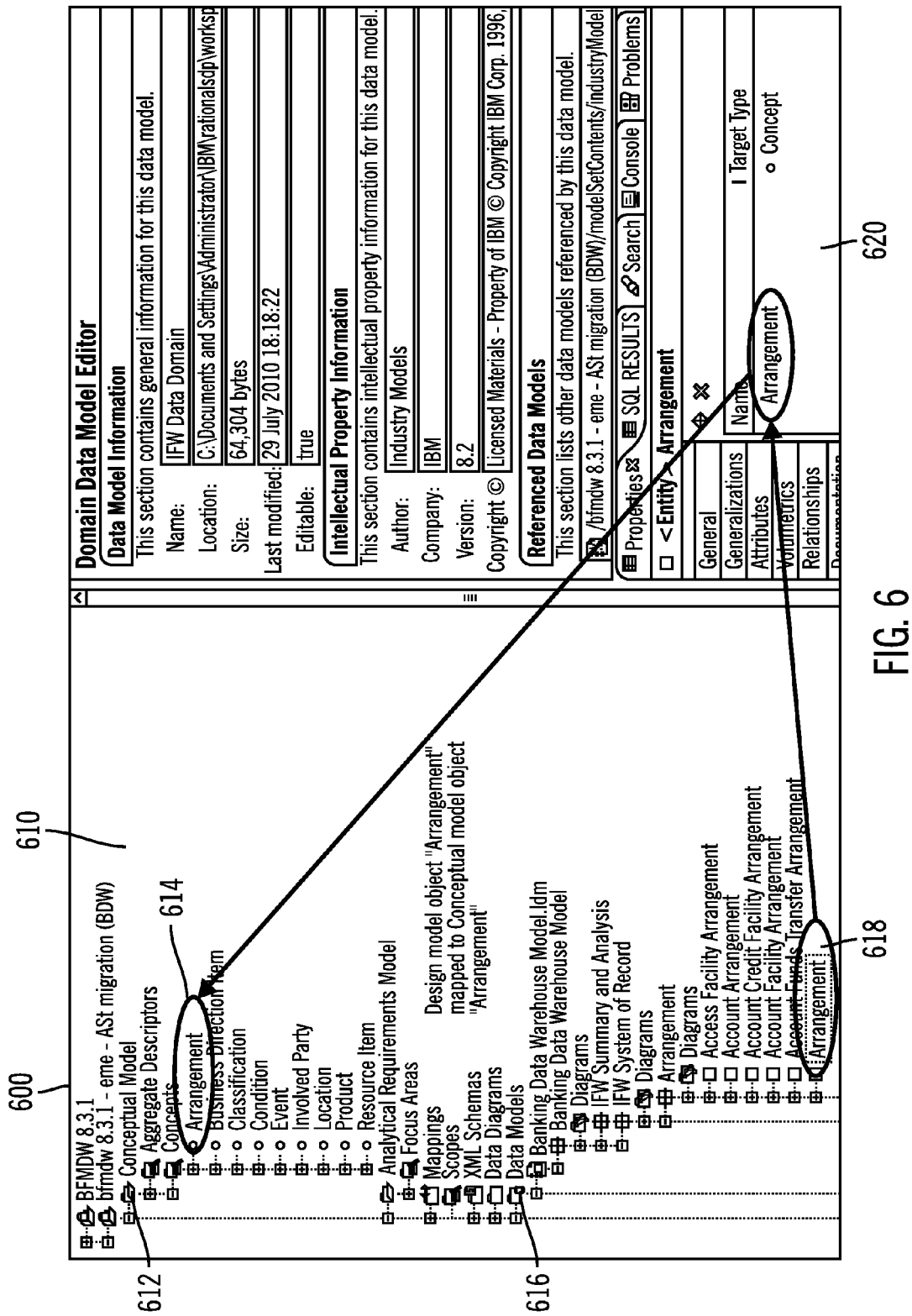
FIG. 6 illustrates a navigation path in accordance with certain embodiments.

FIG. 6 illustrates a user interface 600 displaying a models stack 610 and a navigation path 620 in accordance with certain embodiments. The models stack 610 is illustrated in a left pane of the user interface 600. The navigation path 620 is illustrated in a lower right pane of the user interface 600. When a user selects a model object of a model (e.g., by right clicking on the model object), the navigation path of the selected model object is displayed in the lower right pane. In the example of FIG. 6, the "Arrangement" model object 618 of the "Data Models" 616 has been selected (and the selection is shown by the dotted box around "Arrangement" model object 618), and a navigation path 620 is illustrated. The "Arrangement" model object 618 of the "Data Models" 616 is mapped to the "Arrangement" model object 614 of the "Conceptual Model" 612.

Figure 7:
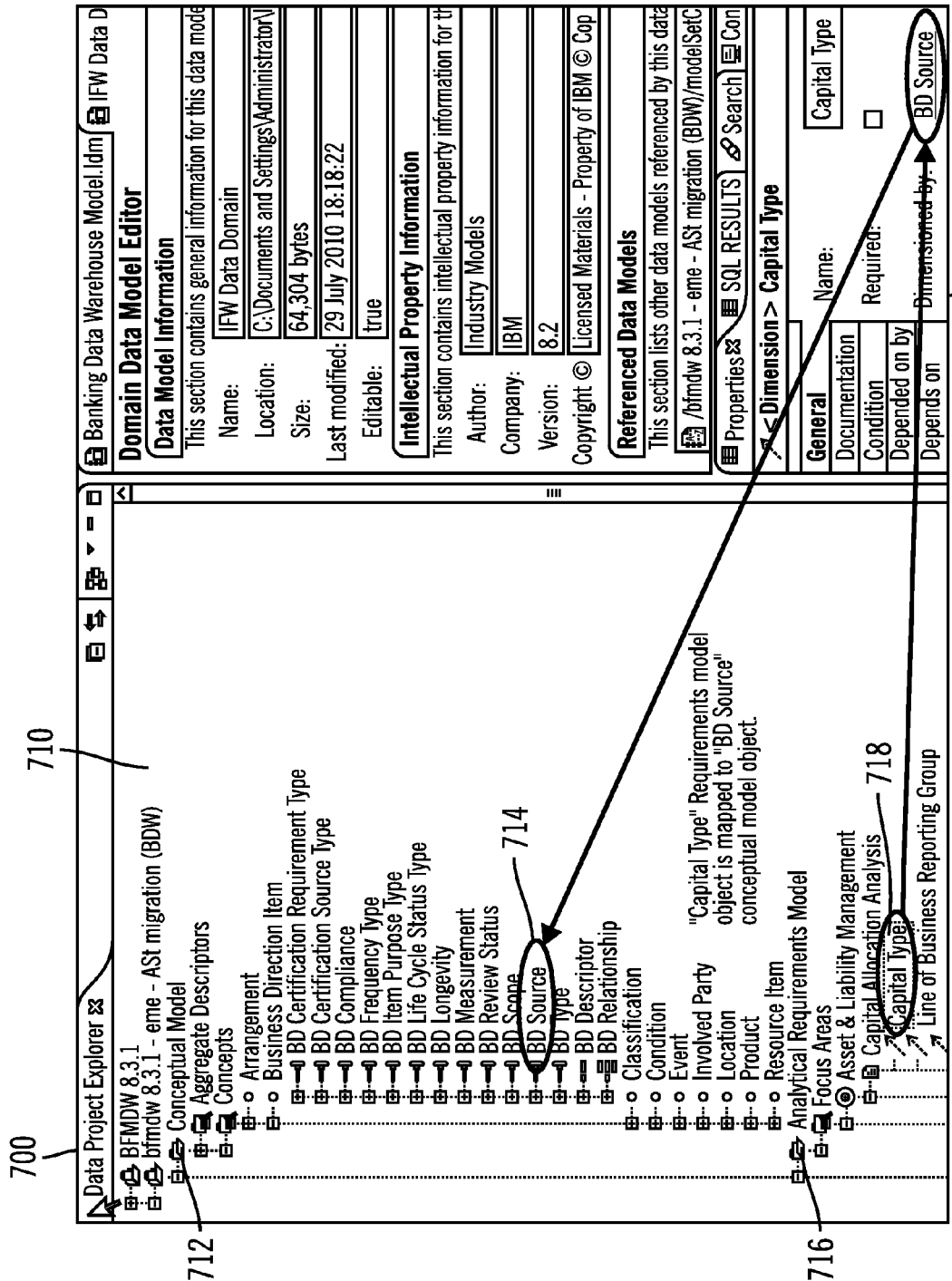
FIG. 7 illustrates a user interface displaying a models stack and mappings in accordance with certain embodiments.

FIG. 7 illustrates a user interface 700 displaying a models stack 710 and a navigation path 720 in accordance with certain embodiments. A "Capital Type" model object 718 of the "Analytical Requirements Model" 716 has been selected in FIG. 7 (and the selection is shown by the dotted box around "Capital Type" model object 718), and a navigation path 720 is illustrated in the lower right pane of the user interface 700. The "Capital Type" model object 718 depends on the "BD Source" model object 714 of the "Conceptual Model" 712. That is, the "Capital Type" model object 718 is mapped to the "BD Source" model object 714.

Figure 8:
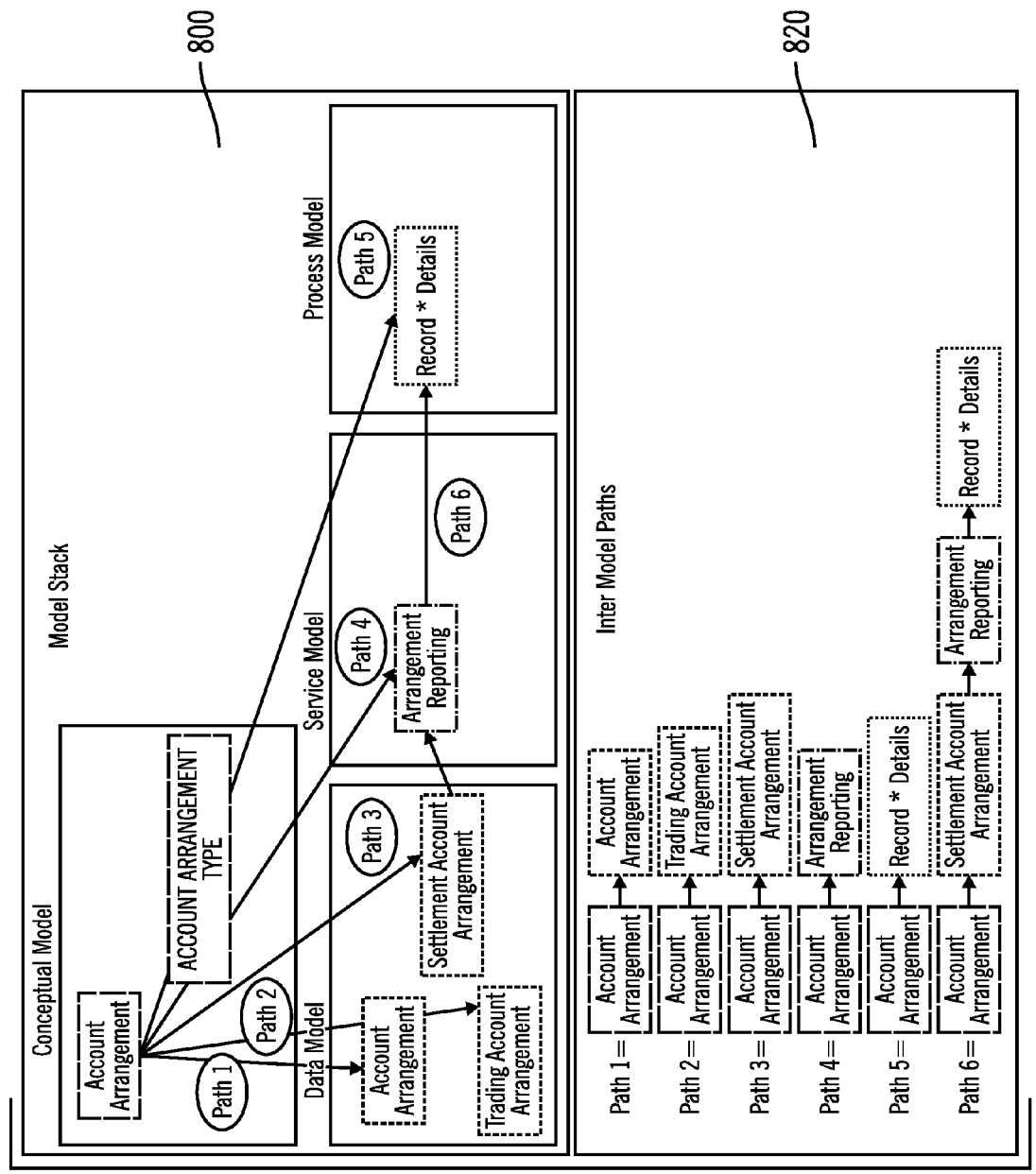
FIG. 8 illustrates an example of a models stack and navigation paths between model objects based on mappings in accordance with certain embodiments.

FIG. 8 illustrates an example of a models stack 800 and navigation paths 820 between model objects based on mappings in accordance with certain embodiments. The navigation paths 820 are possible paths (i.e., ways of traversal between model objects) in the models in the models stack 800. In certain embodiments, the CBN system 110 creates dynamic navigation paths for the model object in context.

With reference to FIG. 8, for example, the "Account Arrangement" model object in "Conceptual Model" has six different navigation paths 820 (i.e., ways of traversal) between different model layers in the models stack 800.

The CBN system 110 dynamically draws the navigation paths as the user transverses the models and incorporates the navigation paths into a navigation paths cache 140 that can be shared or published in a social network. The user can select a navigation path from the navigation paths 820 that are available for the model object in context, and this gives the user real time visualization of how different models are linked in the models stack 800. Also, the user is able to navigate to the desired model object without loosing the context.

The navigation paths 820 may be cached to speed up the look up of all the navigation paths for the model object in context.

Figure 9:
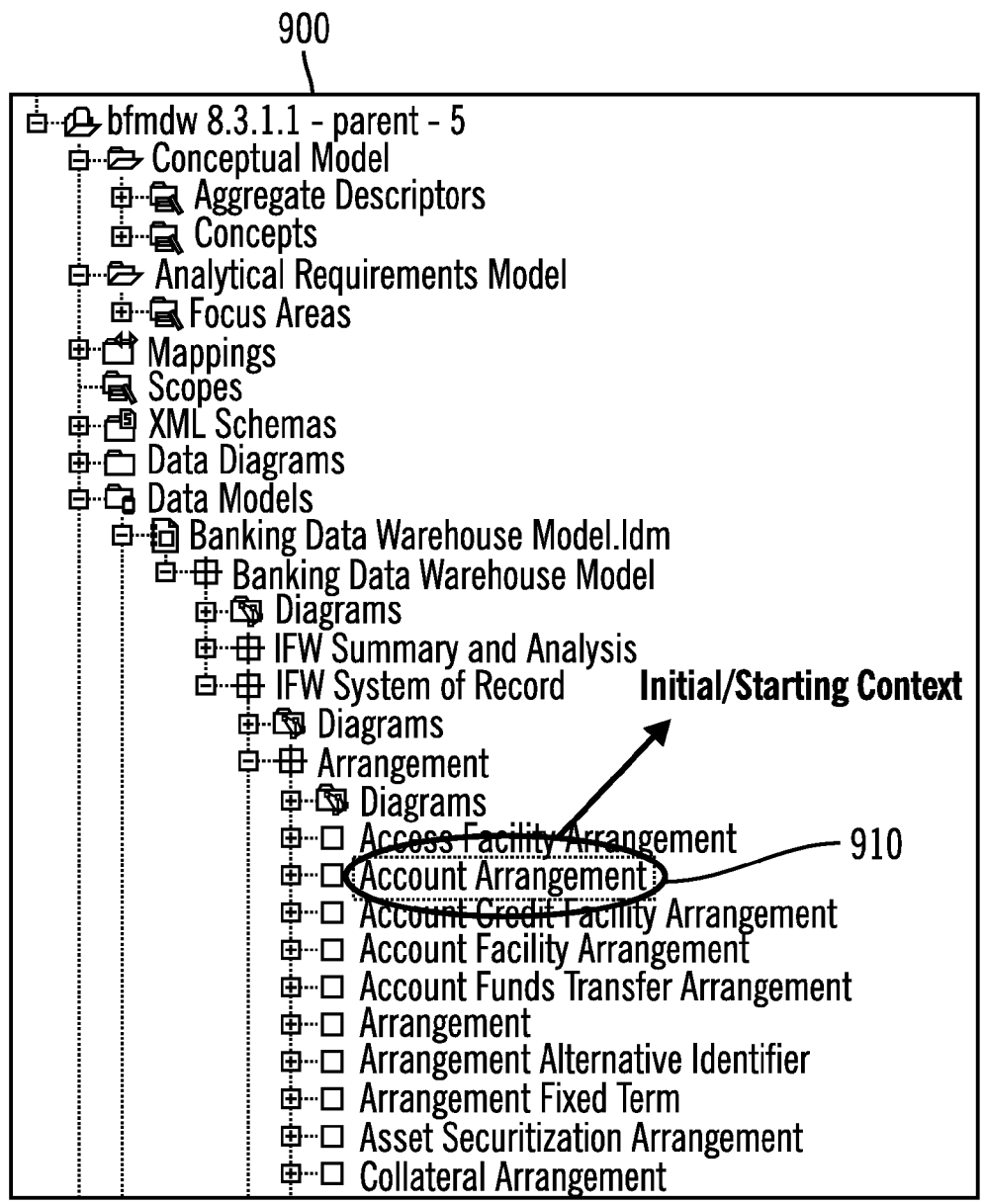
FIG. 9 illustrates a user interface showing an initial context set by a user using user preferences in accordance with certain embodiments.

FIG. 9 illustrates a user interface 900 showing an initial context set by the user using user preferences in accordance with certain embodiments. In the user interface 900, the "Account Arrangement" model object 910 has been selected (and the selection is shown by the dotted box around "Account Arrangement" model object 910).

Figure 10:
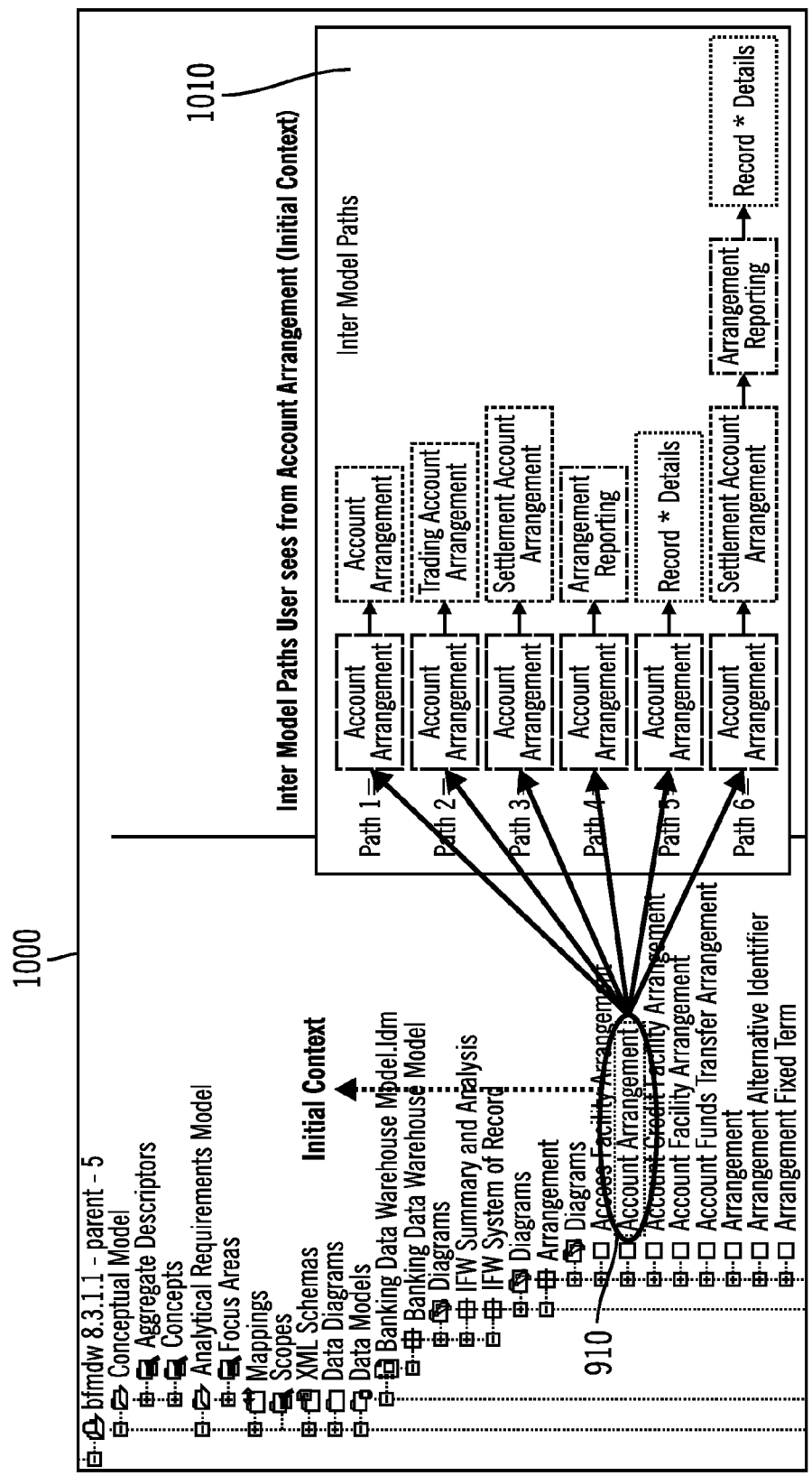
FIG. 10 illustrates a user interface showing visualized navigation paths from the users initial context of an "Account Arrangement" model object in accordance with certain embodiments.

FIG. 10 illustrates a user interface 1000 showing visualized navigation paths 1010 from the users initial context of the "Account Arrangement" model object 910 in accordance with certain embodiments.

Figure 11:
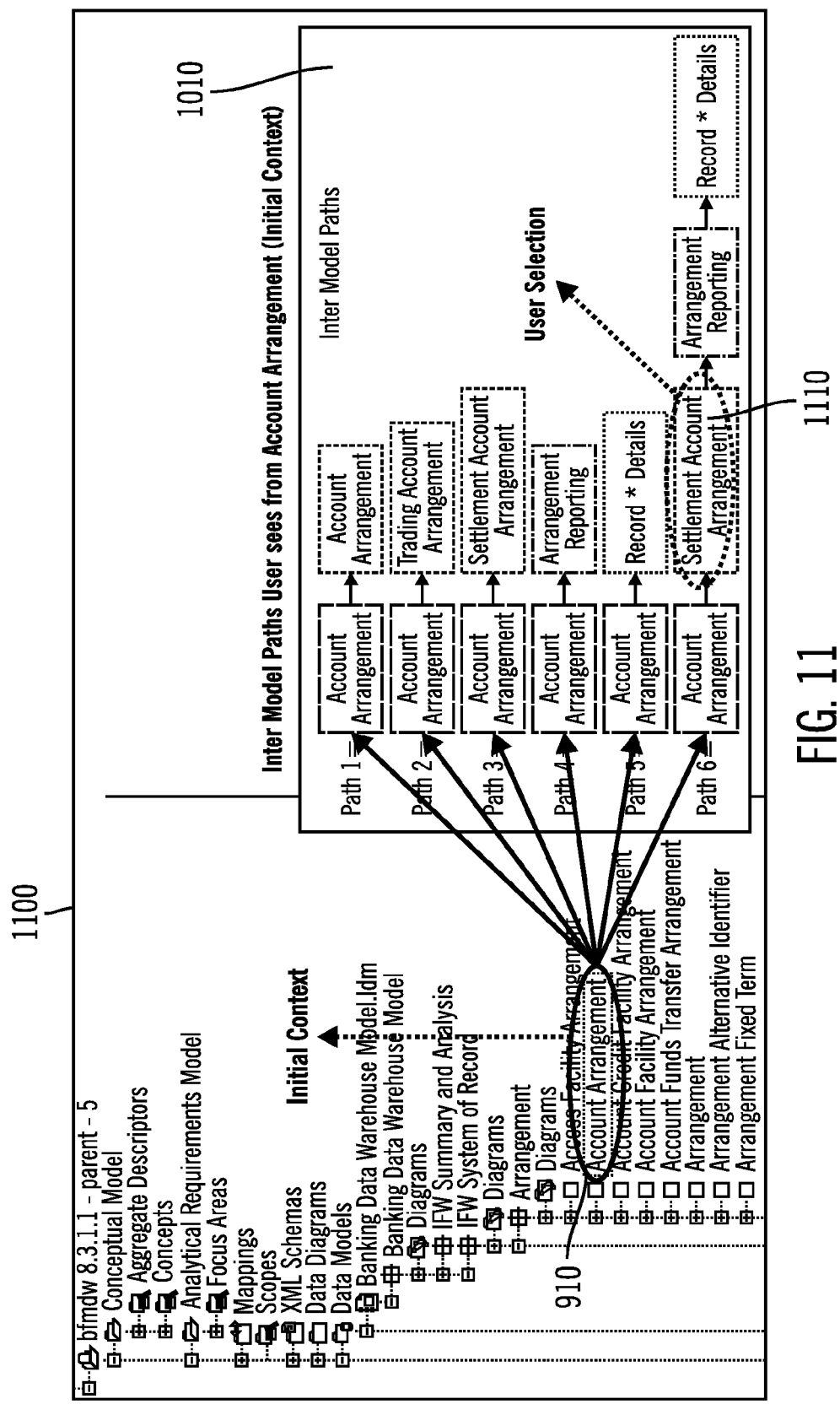
FIG. 11 illustrates a user interface in which a node in a visualized navigation path has been selected in accordance with certain embodiments.

FIG. 11 illustrates a user interface 1100 in which a node in a visualized navigation path has been selected in accordance with certain embodiments. In particular, in the user interface 1100, a "Settlement Account Arrangement" node 1110 (representing a "Settlement Account Arrangement" model object) in path 6 has been selected (e.g., by a user). The "Settlement Account Arrangement" model object becomes the users new, current context.

Figure 12:
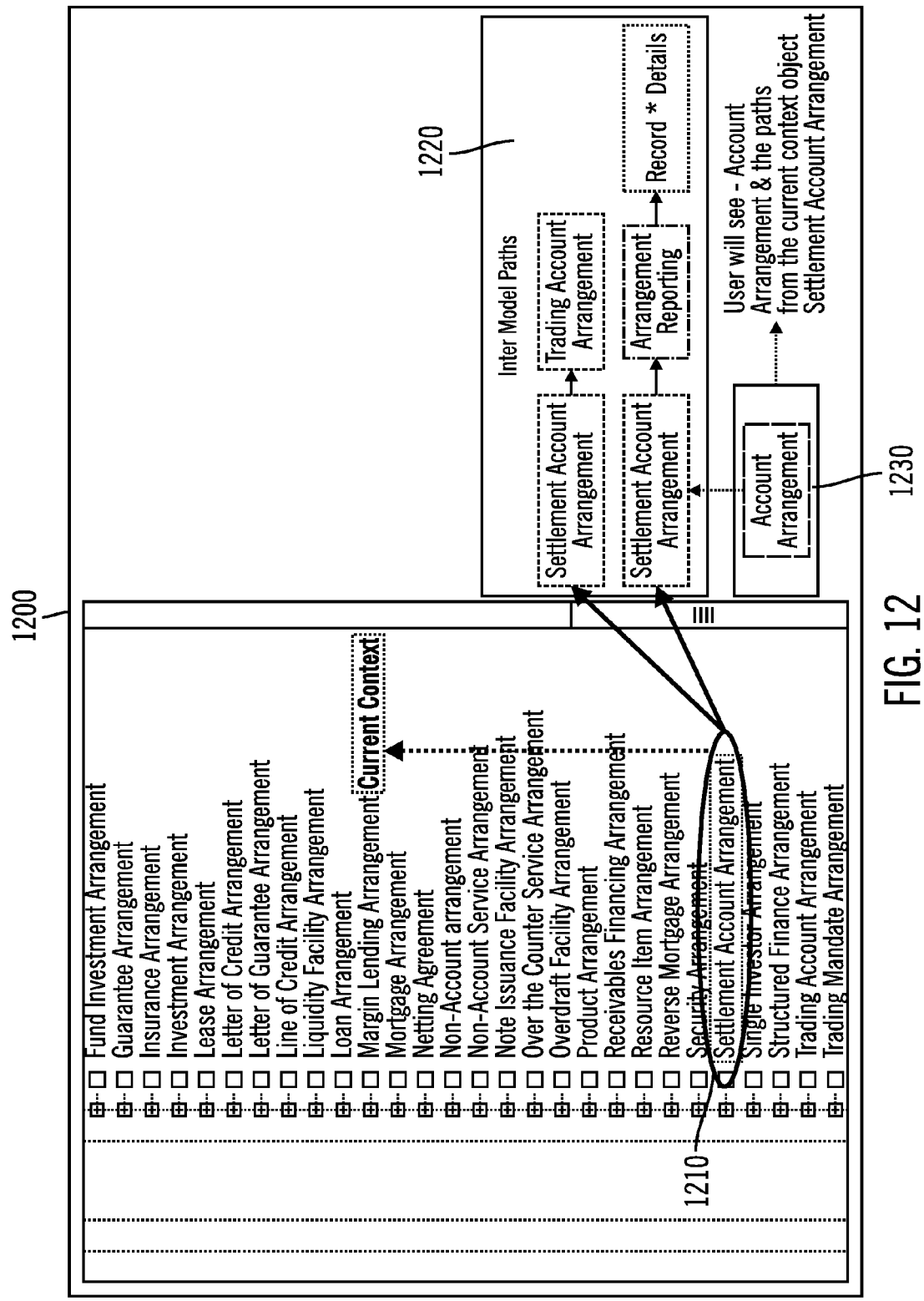
FIG. 12 illustrates a user interface showing available navigation paths from a new, current context in accordance with certain embodiments.

FIG. 12 illustrates a user interface 1200 showing available navigation paths from the new, current context in accordance with certain embodiments. In the user interface 1200, the new, current context is the "Settlement Account Arrangement" model object 1210 (represented by the "Settlement Account Arrangement" node 1110 in FIG. 11). Note that the "Settlement Account Arrangement" model object 1210 is shown as selected in the models stack (and the selection is shown by the dotted box around the "Settlement Account Arrangement" model object 1210). The navigation paths 1220 for the "Settlement Account Arrangement" model object 1210 are shown in the user interface 1200. Also, the initial node ("Account Arrangement" node 1230) that the user navigated from initially is appended to the navigation paths 1220. The user can click on the "Account Arrangement" node 1230 to go back to the initial context, which is the "Account Arrangement" model object 910 represented by the "Account Arrangement" node 1230. Hence, the CBN system 110 provides forward and backward navigation between mapped model objects in different models of a models stack.

The CBN system 110 allows the navigation paths 142 and all model objects (i.e., nodes) that correspond with a navigation path 142 to be created in a real time representation as a user transverses the models stack. Then, the user may use any of the navigation paths 142 to traverse backwards. For example, each of the navigation paths 142 may start with an initial model object in an initial model and end with model objects in different models (e.g., Path1=A→B→C and Path2=A→D→E). Some of these navigation paths 142 may have the same ending model object, but with different intervening model objects in the navigation paths 142 (e.g., Path1=A→B→C and Path2=A→D→E→C). This saves time in trying to find the way back and can be shared among users in a social network who are building or working on the same models stack. The navigation path 142 can be represented using GUI nodes linked together for user visualization.

Figure 13A:
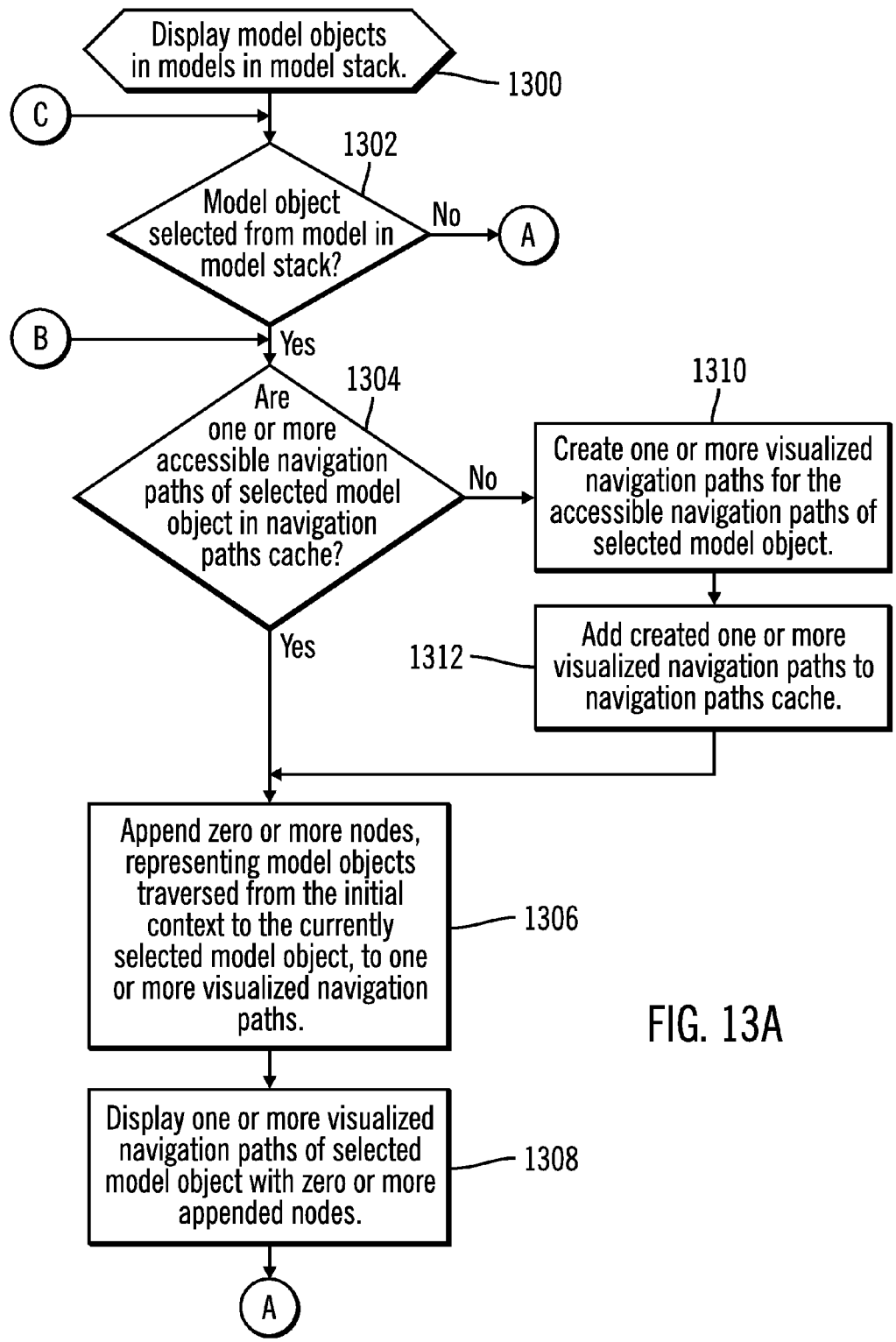
FIG. 13 illustrates, in a flow diagram, logic performed by the CBN system in accordance with certain embodiments.
Figure 13B:
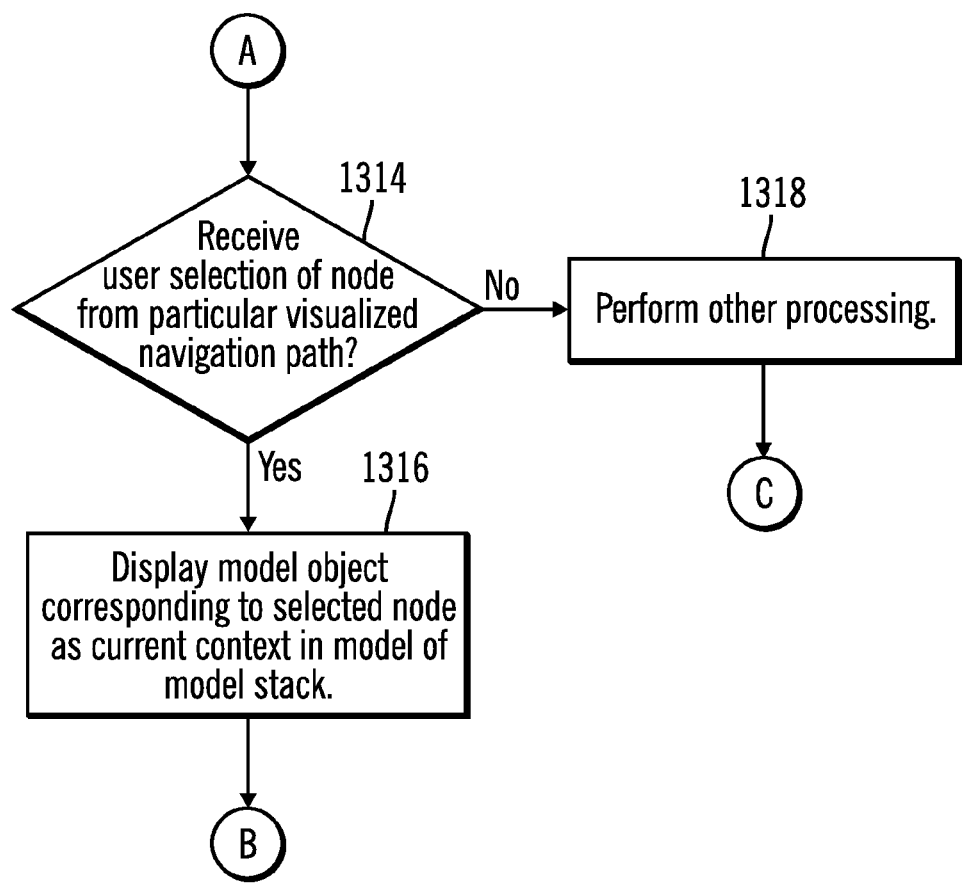

FIG. 13 illustrates, in a flow diagram, logic performed by the CBN system in accordance with certain embodiments. FIG. 13 is formed by FIGS. 13A and 13B. Control begins at block 1300 with the CBN system 110 displaying model objects in models in a models stack. In block 1302, the CBN system 110 determines whether a model object from a model of the models stack has been selected. If so, processing continues to block 1304, otherwise, processing continues to block 1314 (FIG. 13B). In certain embodiments, when the models stack is first displayed, a particular model object is shown as selected and forms an initial context set by the user using user preferences. In certain alternative embodiments, the initial context may be set by the user by directly selecting a model object from a model in the models stack and designating this as the initial context (rather than as a model object that is selected while traversing from the initial context).

In block 1304, the CBN system 110 determines whether one or more accessible navigation paths 142 of the selected model object are in a navigation paths cache 140. If so, processing continues to block 1306, otherwise, processing continues to block 1310.

In block 1306, the CBN system 110 appends zero or more nodes, representing model objects traversed from the initial context to the currently selected model object, to one or more visualized navigation paths 142. In particular, for a new navigation path 142, when the first model object is selected as the initial context, no nodes in a previous context are available, and so zero nodes are appended.

In block 1308, the CBN system 110 displays one or more visualized navigation paths 142 of the selected model object with zero or more appended nodes. From block 1308 (FIG.

13A), processing continues to block 1314 (FIG. 13B). In certain embodiments, the navigation paths 142 are created dynamically. In certain alternative embodiments, the navigation paths 142 are created from the mappings 130 before a user starts navigation of the model objects.

In block 1310, the CBN system 110 creates one or more visualized navigation paths 142 for the accessible navigation paths 142 for the selected model object based on accessible navigation paths 142 for the selected model object. In block 1312, the CBN system 110 adds the created one or more visualized navigation paths 142 to the navigation paths cache 140.

Continuing to FIG. 13B, in block 1314 the CBN system 110 determines whether user selection of a node from a particular visualized navigation path 142 has been received. If so, processing continues to block 1316, otherwise, processing continues to block 1318. In block 1316, the CBN system 110 displays a model object corresponding to the selected node as a current context in a model of the models stack. From block 1316 (FIG. 13B), processing continues to block 1304 (FIG. 13A).

In block 1318, the CBN system 110 performs other processing. From block 1318 (FIG. 13B), processing continues to block 1302 (FIG. 13A).

As an example, the CBN system 110 enables a user to navigate bidirectionally (forward and backwards) between the mapped model objects in various models without loosing the context in the models stack. For example, Model A is at the bottom of a models stack, Model Z is at the top of the models stack, and there are Models B and Model C in the middle of the models stack. In this example, a Model Z model object is mapped to a Model B model object; the Model B model object is mapped to a Model C model object; and, the Model C model object eventually maps to the Model Z model object. That is, the navigation path 142 in a forwards direction is: Model A model object→Model B model object→Model C model object-Model Z model object. The navigation path 142 in a backwards direction is: Model Z model object→Model C model object→Model B model object→Model A model object). The CBN system 110 enables a user to navigate between the example models stack without loosing the current context.

In certain embodiments, there is a user configurable preference to see number of navigation paths 142 at runtime (e.g., how many navigation paths 142 to show from each model object that a user hovers on). In certain embodiments, there is a user configuration to set the destination so that only navigation paths 142 to the destination are shown. In certain embodiments, there is a user configuration to show the shortest navigation paths 142 only.

In certain embodiments, there is a user configuration to set the initial context before the user starts to navigate. In certain embodiments, there is a user preference to re initialize/reset the initial context.

In certain embodiments, the CBN system 110 calculates and creates all navigation paths 142 and all model objects that correspond with these paths. The CBN system 110 enables the navigation paths 142 to be visualized in real time, as a user traverses the models. The user can select the desired navigation path 142 from among available navigation paths 142, and the user can choose a starting model object in the navigation path 142 as the initial context and traverse the selected navigation path 142 without loosing the initial context in a forward or backward direction. Thus, the CBN system 110 also has the ability to recognize and maintain contexts intelligently to traverse the navigation path 142 in a bidirectional way and is able to share and publish the navigation paths 142 in a social network for sharing with other users (e.g., other model developers).

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The CBN system 110 may be implemented as hardware (e.g., hardware logic or circuitry), software, or a combination of hardware and software.

Figure 14:
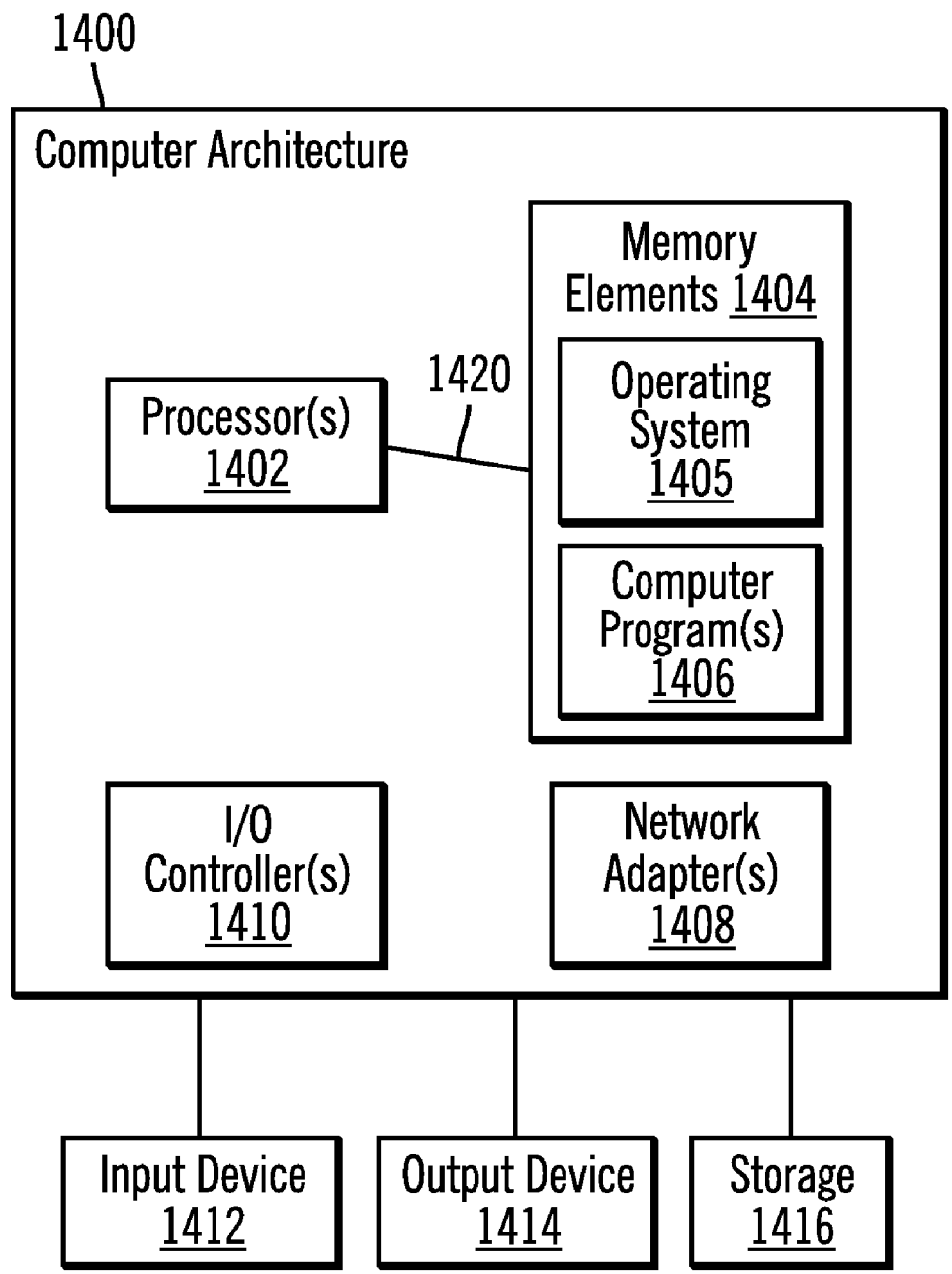
FIG. 14 illustrates, in a block diagram, a computer architecture that may be used in accordance with certain embodiments.

FIG. 14 illustrates a computer architecture 1400 that may be used in accordance with certain embodiments. Computing device 100 may implement computer architecture 1400. The computer architecture 1400 is suitable for storing and/or executing program code and includes at least one processor 1402 coupled directly or indirectly to memory elements 1404 through a system bus 1420. The memory elements 1404 may include local memory employed during actual execution of the program code, bulk storage, and cache memories which provide temporary storage of at least some program code in order to reduce the number of times code must be retrieved from bulk storage during execution. The memory elements 1404 include an operating system 1405 and one or more computer programs 1406.

Input/Output (I/O) devices 1412, 1414 (including but not limited to keyboards, displays, pointing devices, etc.) may be coupled to the system either directly or through intervening I/O controllers 1410.

Network adapters 1408 may also be coupled to the system to enable the data processing system to become coupled to other data processing systems or remote printers or storage devices through intervening private or public networks. Modems, cable modem and Ethernet cards are just a few of the currently available types of network adapters 1408.

The computer architecture 1400 may be coupled to storage 1416 (e.g., a non-volatile storage area, such as magnetic disk drives, optical disk drives, a tape drive, etc.). The storage 1416 may comprise an internal storage device or an attached or network accessible storage. Computer programs 1406 in storage 1416 may be loaded into the memory elements 1404 and executed by a processor 1402 in a manner known in the art.

The computer architecture 1400 may include fewer components than illustrated, additional components not illustrated herein, or some combination of the components illustrated and additional components. The computer architecture 1400 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for navigating model objects, comprising:
displaying the model objects in models in a models stack;
in response to a model object in a model of the models stack being selected as an initial context, displaying one or more navigation paths associated with the selected model object, wherein each of the navigation paths has nodes represented as graphical components that are built in real time and that represent the selected model object and other model objects from the models in the models stack; and
in response to a user selecting a node in one of the one or more navigation paths,
navigating to a new model object represented by the selected node in the models stack in one of a forward direction and a backward direction to provide bidirectional navigation between the model objects in the models without loosing the initial context; and
displaying one or more navigation paths associated with the new model object and at least one appended node that represents a previously traversed model object.

2. The method of claim 1, wherein the models comprise industry models and further comprising:
caching the one or more navigation paths between the model objects in a models stack.

3. The method of claim 1, further comprising:
providing a user interface to allow a user to be able to navigate between the model objects.

4. The method of claim 1, further comprising:
storing the one or more navigation paths in a navigation paths cache without loosing the initial context by appending one or more nodes that each represents a previously traversed model object to each of the navigation paths.

5. The method of claim 1, further comprising:
selecting one of the navigation paths in the navigation paths cache without loosing the initial context.

6. The method of claim 1, further comprising:
as a user is navigating between model objects of models in a models stack, creating the one or more navigation paths in real time, wherein each of the one or more navigation paths includes one or more nodes representing model objects.

7. The method of claim 1, wherein one of the model objects is selected as the initial context based on pre-defined user preferences.

8. The method of claim 1, wherein each of the one or more navigation paths starts with a node representing the selected model object and ends with a different model object in the models stack.

9. The method of claim 1, wherein each of the one or more navigation paths are visualized as a linked set of model objects that are represented as graphical nodes built in real time as a user is navigating between the model objects.

10. A system for navigating model objects, comprising:
a processor; and
hardware logic coupled to the processor and performing operations, the operations comprising:
displaying the model objects in models in a models stack;
in response to a model object in a model of the models stack being selected as an initial context, displaying one or more navigation paths associated with the selected model object, wherein each of the navigation paths has nodes represented as graphical components that are built in real time and that represent the selected model object and other model objects from the models in the models stack; and
in response to a user selecting a node in one of the one or more navigation paths,
navigating to a new model object represented by the selected node in the models stack in one of a forward direction and a backward direction to provide bidirectional navigation between the model objects in the models without loosing the initial context; and
displaying one or more navigation paths associated with the new model object and at least one appended node that represents a previously traversed model object.

11. The system of claim 10, wherein the models comprise industry models and wherein the operations further comprise:
caching the one or more navigation paths between the model objects in a models stack.

12. The system of claim 10, wherein the operations further comprise:
providing a user interface to allow a user to be able to navigate between the model objects.

13. The system of claim 10, wherein the operations further comprise:
storing the one or more navigation paths in a navigation paths cache without loosing the initial context by appending one or more nodes that each represents a previously traversed model object to each of the navigation paths.

14. The system of claim 10, wherein the operations further comprise:
selecting one of the navigation paths in the navigation paths cache without loosing the initial context.

15. The system of claim 10, wherein the operations further comprise:
as a user is navigating between model objects of models in a models stack, creating the one or more navigation paths in real time, wherein each of the one or more navigation paths includes one or more nodes representing model objects.

16. The system of claim 10, wherein one of the model objects is selected as the initial context based on pre-defined user preferences.

17. The system of claim 10, wherein each of the one or more navigation paths starts with a node representing the selected model object and ends with a different model object in the models stack.

18. A computer program product for navigating model objects, the computer program product comprising:
a computer readable storage medium having computer readable program code embodied therewith, the computer readable program code comprising:
computer readable program code, when executed by a processor of a computer, configured to perform:
displaying the model objects in models in a models stack;

in response to a model object in a model of the models stack being selected as an initial context, displaying one or more navigation paths associated with the selected model object, wherein each of the navigation paths has nodes represented as graphical components that are built in real time and that represent the selected model object and other model objects from the models in the models stack; and in response to a user selecting a node in one of the one or more navigation paths, navigating to a new model object represented by the selected node in the models stack in one of a forward direction and a backward direction to provide bidirectional navigation between the model objects in the models without loosing the initial context; and displaying one or more navigation paths associated with the new model object and at least one appended node that represents a previously traversed model object.

19. The computer program product of claim 18, wherein the models comprise industry models and wherein the computer readable program code, when executed by the processor of the computer, is configured to perform:

caching the one or more navigation paths between the model objects in a models stack.

20. The computer program product of claim 18, wherein the computer readable program code, when executed by the processor of the computer, is configured to perform:

providing a user interface to allow a user to be able to navigate between the model objects.

21. The computer program product of claim 18, wherein the computer readable program code, when executed by the processor of the computer, is configured to perform:

storing the one or more navigation paths in a navigation paths cache without loosing the initial context by appending one or more nodes that each represents a previously traversed model object to each of the navigation paths.

22. The computer program product of claim 18, wherein the computer readable program code, when executed by the processor of the computer, is configured to perform:

selecting one of the navigation paths in the navigation paths cache without loosing the initial context.

23. The computer program product of claim 18, wherein the computer readable program code, when executed by the processor of the computer, is configured to perform:

as a user is navigating between model objects of models in a models stack, creating the one or more navigation paths in real time, wherein each of the one or more navigation paths includes one or more nodes representing model objects.

24. The computer program product of claim 18, wherein one of the model objects is selected as the initial context based on pre-defined user preferences.

25. The computer program product of claim 18, wherein each of the one or more navigation paths starts with a node representing the selected model object and ends with a different model object in the models stack.

* * * * *